US011383626B1

(12) United States Patent
Teague

(10) Patent No.: US 11,383,626 B1
(45) Date of Patent: Jul. 12, 2022

(54) BACK SUPPORT

(71) Applicant: James E. Teague, Scottsdale, AZ (US)

(72) Inventor: James E. Teague, Scottsdale, AZ (US)

( * ) Notice: Subject to any disclaimer, the term of this patent is extended or adjusted under 35 U.S.C. 154(b) by 0 days.

(21) Appl. No.: 17/228,865

(22) Filed: Apr. 13, 2021

(51) Int. Cl.
   *B60N 2/66* (2006.01)
   *A47C 7/42* (2006.01)
   *A47C 7/46* (2006.01)

(52) U.S. Cl.
   CPC .............. *B60N 2/663* (2015.04); *A47C 7/425* (2013.01); *A47C 7/465* (2013.01)

(58) Field of Classification Search
   CPC .......... B60N 2/663; A47C 7/425; A47C 7/465
   USPC .............................................. 297/465, DIG. 6
   See application file for complete search history.

(56) References Cited

U.S. PATENT DOCUMENTS

| 3,167,068 | A | * | 1/1965 | Carr | ...................... | A61H 1/0218 |
| | | | | | | 602/32 |
| 4,205,670 | A | * | 6/1980 | Owens | ................... | B60R 22/105 |
| | | | | | | 297/464 |
| 4,487,201 | A | * | 12/1984 | Ciambarella | .......... | B60N 2/663 |
| | | | | | | 297/484 |
| 4,834,459 | A | * | 5/1989 | Leach | .................. | A47D 15/006 |
| | | | | | | 297/487 |
| 8,007,046 | B2 | * | 8/2011 | Rothschild | ............. | B64D 11/06 |
| | | | | | | 297/485 |
| 9,420,832 | B2 | * | 8/2016 | Arnold | ...................... | A41D 1/00 |
| 2011/0181089 | A1 | * | 7/2011 | Hendricks | .............. | A47C 7/425 |
| | | | | | | 297/391 |

* cited by examiner

*Primary Examiner* — Milton Nelson, Jr.
(74) *Attorney, Agent, or Firm* — Daniel M. Cohn; Howard M. Cohn

(57) ABSTRACT

An improved back support designed for use in a seat, to relieve pressure on the user's back. The improved back support includes a first elongated belt segment and a second elongated belt segment. The first elongated belt segment is formed of a first fastening end, and a second attachment end, and the second elongated belt segment is formed of a first fastening end, and a second attachment end. The first elongated belt segment and the second elongated belt segment are adjoined with one or more straps. An individual strap is suspended from the seat to hold the brace in position and when it has been released.

18 Claims, 3 Drawing Sheets

BACK SUPPORT

FIELD OF INVENTION

The present invention relates generally to an improved back support, and more specifically, the present invention relates to an improved back support designed for use in a seat, to relieve pressure on the user's back.

BACKGROUND OF INVENTION

Spinal and lower back muscular pain is a common problem in many individuals. This type of pain, particularly among older or overweight individuals, can easily be aggravated during any type of body trauma such as heavy lifting or physical activity. Prescription drugs, which are not always effective, must often be used to alleviate lower back pain. Day-to-day activity requires movement of the back, which can lead to further muscular aggravation that requires use of the most potent pain relief medications to produce any positive result. To help alleviate lower back pain, prevent injury or aid in recovery, a device that can provide support to the lower back to prevent muscular strain must be used. In the past, many types of devices have been created to help with this problem. These devices range from wrap-type supports to individual solid support fixtures placed longitudinally along the back to restrain movement. Many of these devices are either very heavy, too hot to wear, burdensome by unduly restricting movement, or do not provide the proper back support and alignment to be useful.

A typical car seat generally has a lumbar support, or the portion of a seat back which curves outwardly to support the user's lower back. Some seats have lumbar supports which are adjustable in thickness or firmness by employing internal mechanisms or pump-up bladders. These allow each user to adjust the lumber support for the best personal fit and comfort. However, the range of adjustment is generally not enough to satisfy all users, so that some will be unable to find a comfortable setting. Even new cars are criticized by magazine reviewers for lacking in seating comfort, with the lack of sufficient lumbar support being a common complaint.

SUMMARY OF THE INVENTION

According to a further embodiment of the present invention, there is disclosed an improved back support designed for use in a seat, to relieve pressure on the user's back. The improved back support includes a first elongated belt segment and a second elongated belt segment. The first elongated belt segment is formed of a first fastening end, and a second attachment end, and the second elongated belt segment is formed of a first fastening end, and a second attachment end. The first elongated belt segment and the second elongated belt segment are adjoined with one or more straps. An individual strap is suspended from the seat to hold the brace in position and when it has been released.

According to a further embodiment of the present invention, there is disclosed an improved back support designed for use in a seat, to relieve pressure on the user's back. The improved back support includes a first elongated belt segment and a second elongated belt segment. The first elongated belt segment is formed of a first fastening end, and a second attachment end. The second elongated belt segment formed of a first fastening end, and a second attachment end. The first elongated belt segment and the second elongated belt segment are adjoined with four elastic straps, attached at a first end to the first elongated belt segment at a second attachment end, and attached at a first end to the second elongated belt segment at a second attachment end An individual strap having first and second ends which is suspended from the seat to hold the brace in position and when it has been released.

BRIEF DESCRIPTION OF THE DRAWINGS

The structure, operation, and advantages of the present invention will become further apparent upon consideration of the following description taken in conjunction with the accompanying figures (Figures). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (Figures) of the drawing, in which case typically the last two significant digits may be the same, the most significant digit being the number of the drawing figure (Figure).

FIG. 1 is a front, three-dimensional view of the improved back support in use, according to the present invention.

FIG. 2 is a front, three-dimensional view of the improved back support, according to the present invention.

FIG. 3 is a front view of the improved back support and a car seat, according to the present invention.

FIG. 4 is a side view of the improved back support in use, according to the present invention.

DETAILED DESCRIPTION OF THE PREFERRED EMBODIMENT

Figure 1:
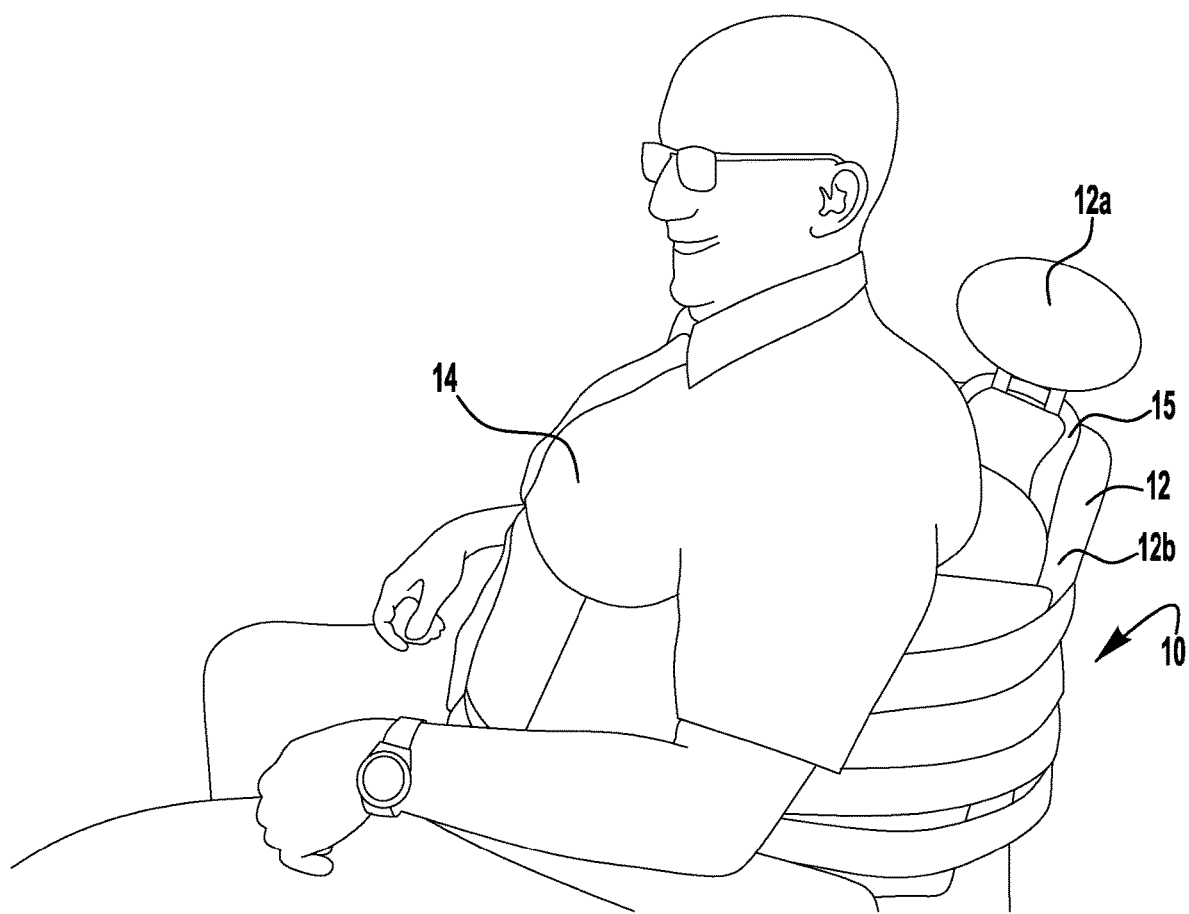

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The improved back support 10 is designed for use in an automobile, truck, farm equipment, airplane or chair, where the user will be confined to a sitting position for an extended period. Improved back support 10 functions to relieve pressure on the user's upper and lower spine and minimize discomfort associated with lower back pain. By holding the user firmly against the seat of the vehicle and eliminating slouching or slumping, the back support 10 substitutes the strength of the device for the body's weakened or declining core strength.

In general terms, the improved back support 10 utilizes stretchable and high density fabric that wraps completely around a seat 12. The user tightly secures first ends 14 to the support body 12, preferably with either Velcro or snap closures. The back support 10 is suspended from the seat's 12 headrest support 12a with an individual strap 15 that serves to hold the brace 10 in position both when the brace is in use and when it has been released.

The improved back support 10 is a one-size-fits-all product. The back support 10 can be expanded to accommodate exceptionally large users or vehicles with exceptionally large seats.

FIG. 1 illustrates a traditional vehicle seating assembly 12, generally including a seat 12b and a seat back 12c that supports a headrest 12a thereon. The seat back 32 is pivotally coupled with the seat 30, such that the seat back 32 can be moved between upright and inclined positions. The headrest 12a is operably coupled with the seat back 12b and also positioned in a variety of positions relative to the seat back 32 to support the head and neck of a driver or a passenger. The user 14 sits on the seat 12b with his back against the seat back 12c. The user 14 may fit the back brace apparatus 10 around his torso as approximately illustrated in FIGS. 1 and 4.

Figure 2:
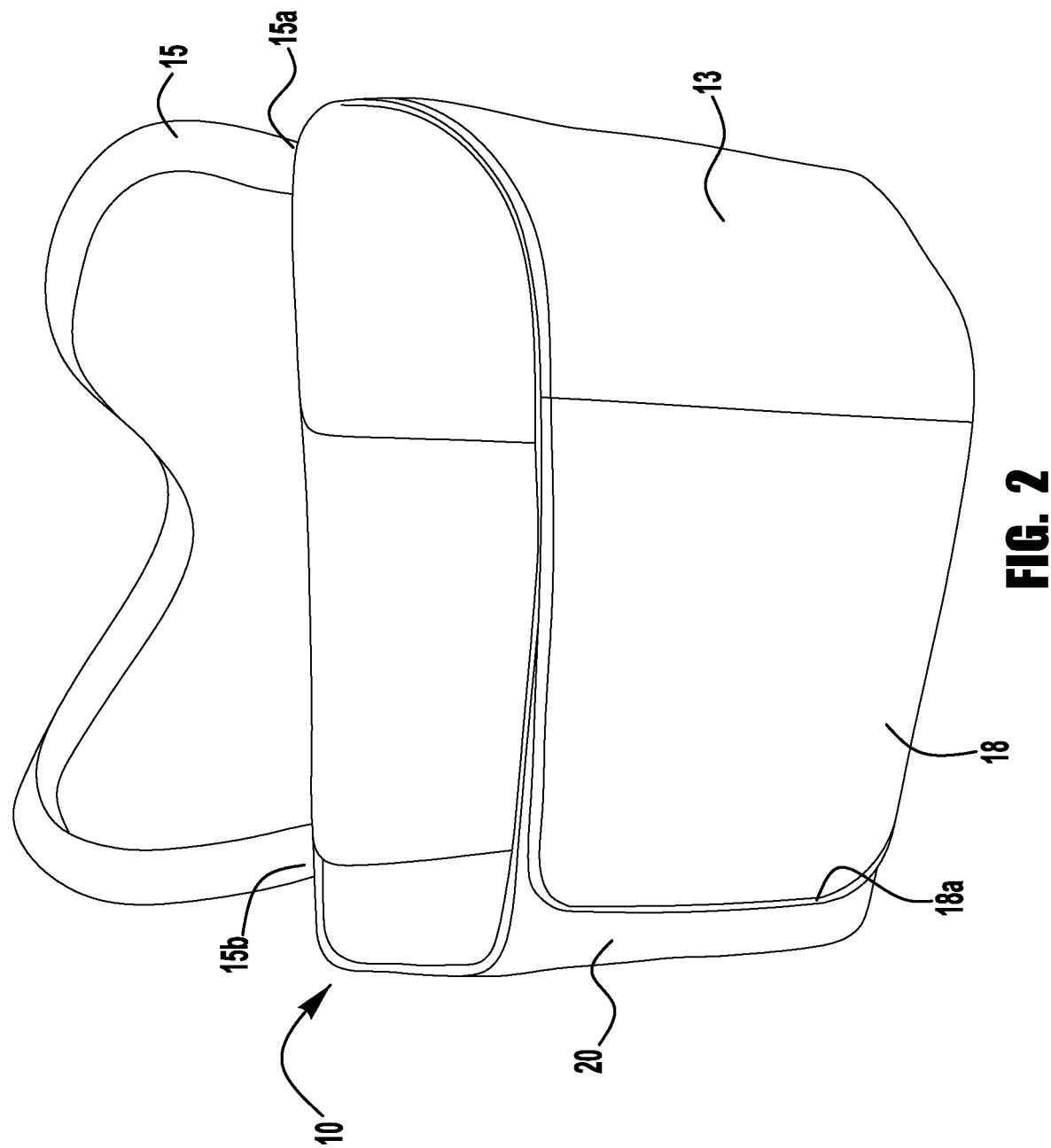
Figure 3:
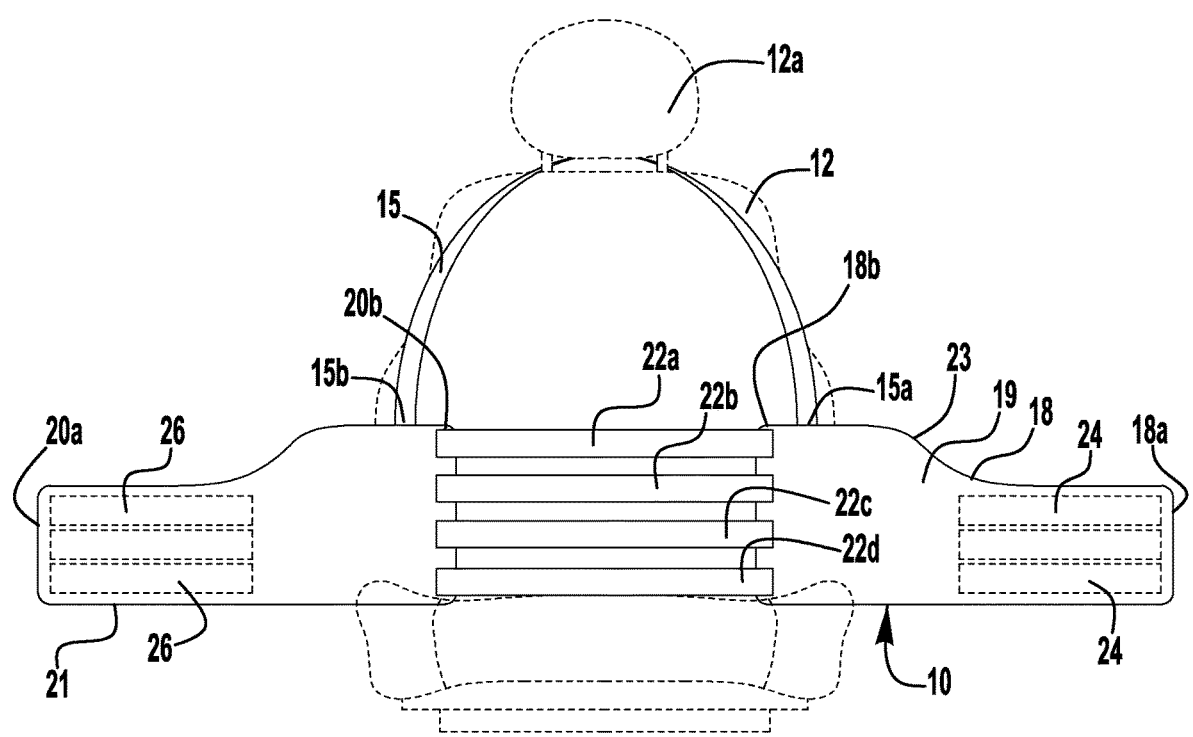

In some embodiments, the improved back support 10 may comprise multiple segments, while in other embodiments the improved back support 10 may comprise a single elongated belt segment. FIGS. 2 and 3 shows an embodiment with multiple segments, comprising a first elongated belt segment 18 and a second elongated belt segment 20. The first elongated belt segment 18 and the second elongated belt segment 20 are adjoined with one or more elastic straps 22, such as straps 22a, 22b, 22c, and 22d (22a-22d).

First elongated belt segment 18 is preferably formed having a first fastening end 18a, and a second attachment end 18b. The first elongated belt segment 18 and second elongated belt segment 20 are adjoined with straps 22a-22d. The straps 22a-22d are adjoined to the first elongated belt segment 18 at the second attachment end 18b. The straps 22a-22d are preferably attached to the second attachment end 18b with an adhesive or stitched thereto.

The fastening end 18a of the first elongated belt segment 18 includes one or more Velcro strips 24. The Velcro strips 24 are integrally attached to the interior surface 19 of the first belt segment 18, preferably with an adhesive or stitched thereto. As illustrated, the area of the first belt segment 18 to which the Velcro strips 24 are integrally attached is narrower than the remaining portion of the belt segment 18. The Velcro strips 24 will have dimensions appropriate to maintain a firm grip to its corresponding Velcro strips 26, as discussed hereinafter. For example, each Velcro strip 24 can have a length with a range between 3 inches to 8 inches, and width with a range between 1 inch to 4 inches. The Velcro strips 24 may either incorporate the hooks or the loops elements of Velcro.

Second elongated belt segment 20 is preferably formed having a first fastening end 20a, and a second attachment end 20b. The straps 22a-22d are adjoined to the second elongated belt segment 20 at the second attachment end 20b. The straps 22a-22d are preferably attached to the second attachment end 20b with an adhesive or stitched thereto.

The fastening end 20a of the second elongated belt segment 20 includes one or more Velcro strips 26. The Velcro strips 26 are integrally attached to the exterior surface 21 of the second belt segment 20, preferably with an adhesive or stitched thereto. As illustrated, the area of the second belt segment 20 to which the Velcro strips 26 are integrally attached is narrower than the remaining portion of the belt segment 20. The Velcro strips 26 will have dimensions appropriate to maintain a firm grip to its corresponding Velcro strips 24. For example, each Velcro strip 26 can have a length with a range between 3 inches to 8 inches, and width with a range between 1 inch to 4 inches. The Velcro strips 24 may either incorporate the hooks or the loops elements of Velcro.

To utilize the improved back support 10, the first elongated belt segment 18 and second elongated belt segment 20 are joined about the torso of the user. The Velcro strips 24 and the corresponding Velcro strips 26 are pressed together, such that hooks catch in the loops and the two pieces fasten or bind temporarily. When separated, by pulling or peeling the Velcro Strips 24 and 26 apart, the strips make a distinctive "ripping" sound, and the user is free from the back support 10.

Figure 4:
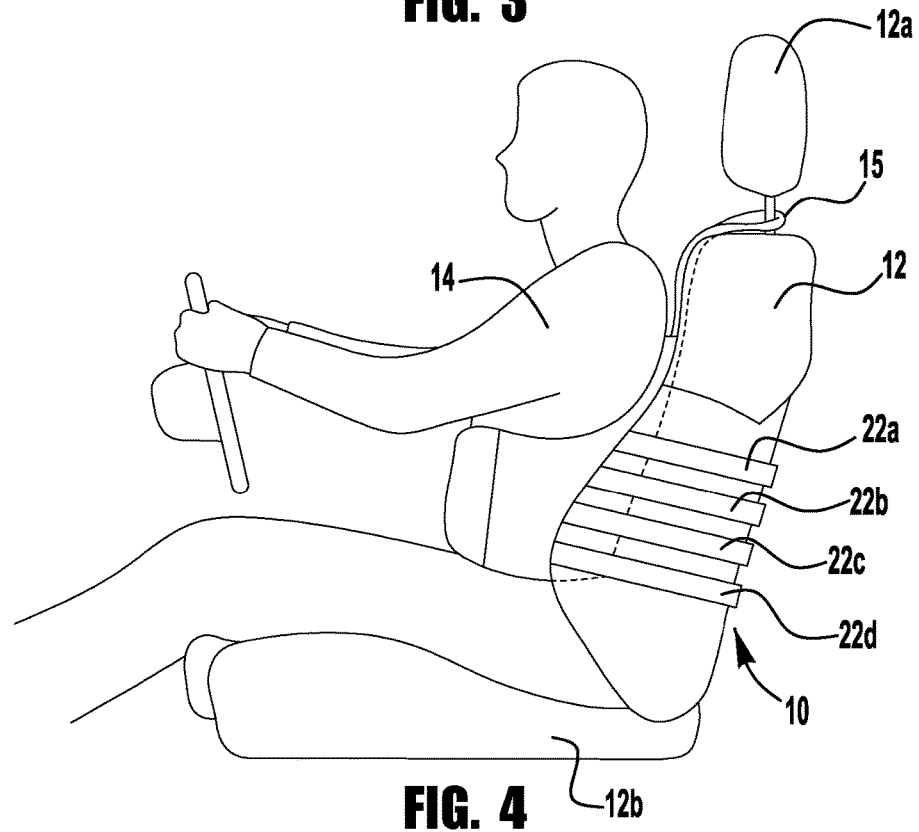

As illustrated in FIGS. 3 and 4, the first elongated belt segment 18 and the second elongated belt segment 20 are adjoined with one or more elastic straps 22, such as straps 22a, 22b, 22c, and 22d (22a-22d). The elastic straps 22 are designed with sufficient elasticity such that the back support 10 can fit any size user.

As seen in FIGS. 2, 3, and 4, the back support brace 10 includes a strap 15 that is designed to be suspended from the seat's 12 headrest support 12a. It secures the brace 10 in position both when the brace is in use and when it has been released. The strap 15 may have any desired length, such as a range between 6 inches and 18 inches. The strap 15 is an elongated strip of material, that may have some degree of elasticity. It includes first and second ends 15a and 15b. First end 15a is attached to the exterior surface 23 of the first belt segment 18, preferably with an adhesive or stitched thereto. Second end 15b is attached to the exterior surface 21 of the second belt segment 20, preferably with an adhesive or stitched thereto.

To utilize the back support brace 10, the user first places the strap 15 that is designed to be suspended from behind the seat's 12 headrest support 12a. Thus, the brace 10 will maintain its position when not in use. Then, the first fastening end 18a of the first elongated belt segment 18, and the first fastening end 20a of the second elongated belt segment 20 are wrapped around towards the front of the seat 12, ensuring that the front of the back support brace 10 is facing forward. Finally, when sitting in the seat 12, the back support brace 10 is wrapped around the user's 14 midsection as snugly as possible.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. An improved back support designed for use with a seat, to relieve pressure on the user's back, comprising:
   a first elongated belt segment and a second elongated belt segment;
   the first elongated belt segment formed of a first fastening end, and a second attachment end;
   the second elongated belt segment formed of a first fastening end, and a second attachment end;
   the first elongated belt segment and the second elongated belt segment adjoined with one or more straps;
   and an individual strap which is suspended from the seat to hold the back support in position and when the back support has been released from the seat;
   wherein four elastic straps adjoin the first elongated belt segment and the second elongated belt segment.

2. The improved back support of claim 1, wherein the individual strap includes first and second ends, and the first end is attached to the exterior surface of the first belt segment, and the second end is attached to the exterior surface of the second belt segment.

3. The improved back support of claim 1, wherein the seat is selected from a group consisting of an automobile seat, an airplane seat, and a truck seat.

4. The improved back support of claim 1, wherein a first two of the four elastic straps are attached to the first elongated belt segment at the second attachment end.

5. The improved back support of claim 4, wherein a second two of the four elastic straps are adjoined to the second elongated belt segment at the second attachment end.

6. The improved back support of claim 5, wherein the first elongated belt segment and the second elongated belt segment are adjoined with the four elastic straps attached to the first elongated belt segment at the second attachment end and to the second elongated belt segment at the second attachment end.

7. The improved back support of claim 6, wherein the first two of the four elastic straps attached to the first elongated belt segment at the second attachment end and the second two of the four elastic straps connected to the second elongated belt segment at the second attachment end are each attached with an adhesive.

8. The improved back support of claim 6, wherein the first two of the four elastic straps attached to the first elongated belt segment at the second attachment end and the second two of the four elastic straps connected to the second elongated belt segment at the second attachment end are each stitched thereto.

9. The improved back support of claim 1, wherein the fastening end of the first elongated belt segment includes one or more hook and loop fastener strips.

10. The improved back support of claim 9, wherein the hook and loop fastener strips are integrally attached to an interior surface of the first elongated belt segment.

11. The improved back support of claim 9, wherein the area of the first belt segment to which the hook and loop fastener strips are integrally attached is narrower than the remaining portion of the first belt segment.

12. The improved back support of claim 11, wherein the hook and loop fastener strips are integrally attached to an exterior surface of the second elongated belt segment.

13. The improved back support of claim 12, wherein the area of the second belt segment to which the hook and loop fastener strips are integrally attached is narrower than the remaining portion of the second belt segment.

14. The improved back support of claim 12, wherein the hook and loop fastener strips integrally attached to the interior surface of the first elongated belt segment and the hook and loop fastener strips integrally attached to the exterior surface of the second elongated belt segment are pressed together to fasten the improved back support about the user.

15. An improved back support designed for use in a seat, to relieve pressure on the user's back, comprising
   a first elongated belt segment and a second elongated belt segment;
   the first elongated belt segment formed of a first fastening end, and a second attachment end;
   the second elongated belt segment formed of a first fastening end, and a second attachment end;
   the first elongated belt segment and the second elongated belt segment adjoined with four elastic straps, attached at a first end to the first elongated belt segment at a second attachment end, and attached at a first end to the second elongated belt segment at a second attachment end;
   and an individual strap having first and second ends which is suspended from the seat to hold the back support in position and when the back support has been released from the seat.

16. The improved back support of claim 15, wherein the first end of the individual strap is attached to the exterior surface of the first belt segment, and the second end of the individual strap is attached to the exterior surface of the second belt segment.

17. The improved back support of claim 15, wherein the fastening end of the first elongated belt segment includes one or more hook and loop fastener strips integrally attached to an interior surface of the first elongated belt segment.

18. The improved back support of claim 17, wherein the fastening end of the second elongated belt segment includes one or more hook and loop fastener strips integrally attached to an exterior surface of the second elongated belt segment.

* * * * *